(12) United States Patent
Dalmatov et al.

(10) Patent No.: US 10,318,169 B2
(45) Date of Patent: Jun. 11, 2019

(54) LOAD BALANCING OF I/O BY MOVING LOGICAL UNIT (LUN) SLICES BETWEEN NON-VOLATILE STORAGE REPRESENTED BY DIFFERENT ROTATION GROUPS OF RAID (REDUNDANT ARRAY OF INDEPENDENT DISKS) EXTENT ENTRIES IN A RAID EXTENT TABLE OF A MAPPED RAID DATA STORAGE SYSTEM

(71) Applicant: EMC IP Holding Company LLC, Hopkinton, MA (US)

(72) Inventors: Nickolay Dalmatov, Saint Petersburg (RU); Michael Wahl, Bulverde, TX (US); Jian Gao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 6 days.

(21) Appl. No.: 15/795,655

(22) Filed: Oct. 27, 2017

(65) Prior Publication Data

US 2019/0129614 A1    May 2, 2019

(51) Int. Cl.
*G06F 3/06* (2006.01)

(52) U.S. Cl.
CPC ............ *G06F 3/061* (2013.01); *G06F 3/0619* (2013.01); *G06F 3/0665* (2013.01); *G06F 3/0689* (2013.01)

(58) Field of Classification Search
CPC ...... G06F 3/061; G06F 3/0689; G06F 3/0665; G06F 3/0619
See application file for complete search history.

(56) References Cited

U.S. PATENT DOCUMENTS

| | | |
|---|---|---|
| 5,579,475 A | 11/1996 | Blaum et al. |
| 5,758,118 A | 5/1998 | Choy et al. |
| 5,875,457 A | 2/1999 | Shalit |
| 6,567,889 B1 | 5/2003 | DeKoning et al. |
| 6,850,443 B2 | 2/2005 | Lofgren et al. |
| 6,857,059 B2 | 2/2005 | Karpoff et al. |

(Continued)

OTHER PUBLICATIONS

Blaum, et al., "EVENODD: An Optical Scheme for Tolerating Double Disk Failures in RAID Architectures", RAID Architectures: IBM Research Report, RJ 9506, Sep. 1993, pp. 245-254.
Miller, Scott A., "Comparing RAID 10 and RAID 01", SMB IT Journal; Jul. 30, 2014; <<http://www.smbitjournal.com/2014/07/comparing-raid-10-and-raid-01/>>article accessed Mar. 21, 2017, 6 pages.

(Continued)

*Primary Examiner* — David Yi
*Assistant Examiner* — Zubair Ahmed
(74) *Attorney, Agent, or Firm* — BainwoodHuang

(57) ABSTRACT

Load balancing in a mapped RAID data storage system that moves slices of logical unit (LUN) address space between non-volatile storage represented by different rotation groups of RAID extent entries in a RAID extent table. The RAID extent table is divided into RAID extent groups corresponding to partnership groups of drives, and the RAID extent groups are divided into rotation groups. At least one LUN with an address space made up of slices is generated for each RAID extent group. Host data directed to each slice is stored in drive extents indicated by the RAID extent entries in the rotation group to which the slice is mapped. A rebalancing operation modifies the mapping between slices in a LUN and the rotation groups in the corresponding RAID extent group such that at least one slice is remapped from a heavily loaded rotation group to a lightly loaded rotation group.

20 Claims, 5 Drawing Sheets

(56) References Cited

U.S. PATENT DOCUMENTS

| | | |
|---|---|---|
| 6,901,478 B2 | 5/2005 | Bak et al. |
| 7,111,117 B2 | 9/2006 | Franklin et al. |
| 7,409,625 B2 | 8/2008 | Corbett et al. |
| 8,316,288 B2 | 11/2012 | Nowoczynski et al. |
| 8,463,992 B2 | 6/2013 | Kelton et al. |
| 8,914,578 B2 | 12/2014 | DeNeui et al. |
| 9,417,822 B1 | 8/2016 | Ballance |
| 2004/0260967 A1 | 12/2004 | Guha et al. |
| 2006/0075283 A1 | 4/2006 | Hartung et al. |
| 2008/0256427 A1 | 10/2008 | He et al. |
| 2011/0145535 A1 | 6/2011 | Kusama et al. |
| 2012/0137065 A1 | 5/2012 | Odenwald et al. |
| 2018/0314609 A1* | 11/2018 | Maeda ............... G06F 11/2094 |

OTHER PUBLICATIONS

Patterson, et al., "A Case for Redundant Arrays of Inexpensive Disks (RAID)", Proceedings of the 1988 ACM SIGMOD International Conference on Management of Data, ACM, 1988, pp. 109-116.

Perumal, et al., "A Tutorial on RAID Storage Systems", CSO4-05-00. May 6, 2004. Data Network Architectures Group. Department of Computer Science. University of Capetown, 23 pages.

"Logical Block Addressing", DEW Associates Corporation, 1995-2002; <<http://www.dewassoc.com/kbase/hard_drives/lba.htm>>article was accessed on Sep. 6, 2017, 2 pages.

"USB Flash Wear-Leveling and Life Span", CORSAIR, Jun. 2007, 2 pages.

* cited by examiner

LOAD BALANCING OF I/O BY MOVING LOGICAL UNIT (LUN) SLICES BETWEEN NON-VOLATILE STORAGE REPRESENTED BY DIFFERENT ROTATION GROUPS OF RAID (REDUNDANT ARRAY OF INDEPENDENT DISKS) EXTENT ENTRIES IN A RAID EXTENT TABLE OF A MAPPED RAID DATA STORAGE SYSTEM

TECHNICAL FIELD

The present disclosure relates generally to intelligent data storage systems that provide RAID (Redundant Array of Independent Disks) data storage technology, and more specifically to technology for providing load balancing of I/O by moving slices of a logical unit (LUN) between non-volatile storage represented by different rotation groups of RAID extent entries of a RAID extent table of a mapped RAID (Redundant Array of Independent Disks) data storage system.

BACKGROUND

Data storage systems are arrangements of hardware and software that typically include one or more storage processors coupled to arrays of non-volatile data storage drives, such as magnetic disk drives, flash solid state drives, and/or optical drives. The storage processors service host I/O operations received from host machines. The received I/O operations specify one or more storage objects (e.g. logical disks sometimes referred to as logical units or "LUNs") that are to be written, read, created, or deleted in accordance with the received I/O operations. The storage processors run software that manages incoming I/O operations and performs various data processing tasks to organize and secure the host data that is received from the host machines and then stored on the non-volatile data storage devices.

Some previous data storage systems have provided traditional RAID (Redundant Array of Independent Disks) technology. Traditional RAID is a data storage virtualization/protection technology that can be used to combine multiple physical drives into a single logical unit to provide data redundancy and/or performance improvement. Data may be distributed across the drives in one of several ways, referred to as RAID levels or configurations, depending on the required levels of redundancy and performance. Some RAID levels employ data striping ("striping") to improve performance. In general, striping involves segmenting received host data into logically sequential blocks (e.g. sequential blocks of a logical storage object), and then storing data written to consecutive blocks in the logical sequence of blocks onto different drives. A series of consecutive logically sequential data blocks that are stored across different drives is sometimes referred to as a RAID "stripe". By spreading data segments across multiple drives that can be accessed concurrently, total data throughput can be increased.

Some RAID levels employ a "parity" error protection scheme to provide fault tolerance. When a RAID level with parity protection is used, one or more additional parity blocks are maintained in each stripe. For example, a parity block for a stripe may be maintained that is the result of performing a bitwise exclusive "OR" (XOR) operation across the data blocks of the stripe. When the storage for a data block in the stripe fails, e.g. due to a drive failure, the lost data block can be recovered by performing an XOR operation across the remaining data blocks and the parity block.

One example of a RAID configuration that uses block level striping with distributed parity error protection is 4D+1P ("four data plus one parity") RAID-5. In 4D+1P RAID-5, each stripe consists of 4 data blocks and a block of parity information. In a traditional 4D+1P RAID-5 disk group, at least five storage disks are used to store the data and parity information, so that each one of the four data blocks and the parity information for each stripe can be stored on a different disk. A spare disk is also kept available to handle disk failures. In the event that one of the disks fails, the data stored on the failed disk can be rebuilt onto the spare disk by performing XOR operations on the remaining data blocks and the parity information on a per-stripe basis. 4D+1P RAID-5 is generally considered to be effective in preventing data loss in the case of single disk failures. However, data may be lost when two or more disks fail concurrently.

Other RAID configurations provide data protection even in the event that multiple disks fail concurrently. For example, 4D+2P RAID-6 provides striping with double distributed parity information that is provided on a per-stripe basis. The double parity information maintained by 4D+2P RAID-6 enables data protection for up to a maximum of two concurrently failing drives.

In order to provide high levels of system performance and increased lifetimes for solid state drives, I/O operations received by a data storage system should be balanced both across and within the data storage drives that are connected to and/or contained within a data storage system. In particular, solid state drives are sometimes made up of multiple, individually erasable cells, each of which can be put through only a limited number of program and erase cycles before becoming unreliable. The term "wear leveling" refers to techniques for distributing I/O operations (e.g. I/O write operations) evenly across the blocks of a data storage drive (e.g. a solid state drive), in order to extend the life of the drive.

SUMMARY

The mapped RAID technology described herein provides improvements with regard to the technical shortcomings of previous data storage systems that used traditional RAID technology. In contrast to the mapped RAID technology described herein, previous data storage systems that used traditional RAID have exhibited significant limitations with regard to the ability to add new disks, and with regard to the amount of time required to rebuild data onto a replacement disk in the event of a disk failure. For example, traditional RAID systems have not supported the addition of new disks on an individual disk basis, but have instead required that new storage capacity be added only in increments equal to the minimum number of disks that is required to support the specific RAID configuration, i.e. a number of disks equal to the width of the RAID stripe being used. Accordingly, for 4D+1P RAID-5 configurations, new disks could only be added to a traditional RAID system in increments of five disks at a time. For 4D+2P RAID-6 configurations, new disks could only be added to traditional RAID systems in increments of six disks. As the capacity of individual disks has increased over time with the introduction of new storage technologies, this inflexibility in traditional RAID systems with regard to adding new capacity has become increasingly burdensome and impractical.

In another example, as the total capacity of individual disks has increased, the amount of time required by traditional RAID systems to rebuild data of an entire failed disk onto a single spare disk has also increased, and the write bandwidth of the single spare disk has become a significant performance bottleneck with regard to total rebuild time. Moreover, while data previously stored on the failed disk is being rebuilt onto the spare disk, concurrent failure of one or more additional disks in a traditional RAID system during the rebuilding process may introduce the risk of data loss.

The mapped RAID technology described herein improves on traditional RAID technology by allowing for the addition of individual non-volatile data storage drives to a data storage system in order to increase the storage capacity of the system, and also addresses the problem of long rebuild times in traditional RAID caused by write bandwidth bottlenecks when writing to dedicated spare disks. In the mapped RAID technology described herein, each data storage drive is divided into multiple contiguous regions of non-volatile data storage referred to as "drive extents" that are allocated from a drive extent pool. A RAID extent table contains a number of RAID extent entries, each one of which indicates a set of drive extents that have been allocated to that RAID extent entry, and that are used to store host data written to a corresponding RAID extent located within a logical address space representing the non-volatile storage represented by the RAID extent table. Each RAID extent entry in the RAID extent table indicates a unique set of drive extents allocated from the drive extent pool, and each drive extent allocated to a given RAID extent must be located on a different data storage drive. In this way, the drive extents indicated by a RAID extent entry are used to store the blocks of data and parity information for a stripe of non-volatile data storage represented by the RAID extent entry. Accordingly, the total number of drive extents indicated by each RAID extent entry in the RAID extent table may be the same as the number of disks used in a traditional RAID system to store data blocks and parity information for the same RAID level. For example, in a mapped RAID system supporting a 4D+1P RAID-5 configuration, each RAID extent entry in the RAID extent table indicates a total of five drive extents that are used to store the four blocks of host data, as well as the parity information block of the stripe represented by the RAID extent. In a 4D+2P RAID-6 mapped RAID configuration, two parity information blocks are indicated by each RAID extent entry to provide an increased level of fault tolerance, and each RAID extent entry in the RAID extent table indicates a total of six drive extents.

In the event that a drive fails in a mapped RAID system, spare drive extents can be allocated that are located on multiple data storage drives that contribute to the drive extent pool in order to replace the drive extents from the failed drive, thus advantageously increasing parallel processing by spreading the rebuild read and write operations across multiple data storage drives, and effectively eliminating the write bandwidth bottleneck previously caused by traditional RAID's reliance on rebuilding to a single spare disk. In this way, mapped RAID can generally reduce rebuild time in the face of a single drive failure. Moreover, as the number of data storage drives being used increases, the amount of concurrent processing that can be occur during the rebuild process may also increase, generally resulting in progressive improvement in rebuild performance for increasing numbers of data storage drives that contribute to the drive extent pool.

In addition to the above described improvements over traditional RAID provided by the disclosed mapped RAID technology in terms of supporting the addition of individual non-volatile data storage drives and reducing rebuild times, the technology disclosed herein addresses shortcomings of previous data storage technology with regard to load balancing. Traditional data storage systems have performed I/O balancing across different traditional RAID groups of data storage devices by moving portions (e.g. slices) of a storage object between traditional RAID groups of data storage devices. Unfortunately, such an approach is not effective in the context of a mapped RAID data storage system, in which a single unit of a storage object can potentially be mapped to all the data storage devices contained in or attached to the data storage system.

In the disclosed technology, load balancing is performed in a data storage system that provides mapped RAID data protection by moving slices of logical unit (LUN) address space between non-volatile storage represented by different rotation groups of RAID extent entries in a RAID extent table. The data storage system includes at least one storage processor and an array of data storage drives communicably coupled to the storage processor. The data storage drives in the array are divided into multiple partnership groups. Each data storage drive in the array is contained in only one partnership group. A RAID extent table is generated that contains multiple RAID extent entries. Each RAID extent entry contained in the RAID extent table indicates multiple drive extents. Each drive extent is a unique contiguous region of non-volatile data storage located on one of the data storage drives. Each one of the data storage drives has multiple drive extents located thereon. The RAID extent entries in the RAID extent table are divided into multiple RAID extent groups contained in the RAID extent table. Each one of the RAID extent groups contains multiple RAID extent entries and corresponds to one of the partnership groups. The RAID extent entries contained in each RAID extent group only indicate drive extents that are located on the data storage drives that are contained in the corresponding partnership group.

Each RAID extent group is divided into multiple rotation groups. Each rotation group contains the same number of RAID extent entries, and each RAID extent entry is contained in only one rotation group.

A corresponding logical unit (LUN) is generated for each one of the RAID extent groups. Each LUN is made up of multiple slices. Host data directed to each slice is stored in drive extents indicated by RAID extent entries in a rotation group to which the slice is mapped according to a mapping between the slices in the LUN and the rotation groups in the RAID extent group corresponding to the LUN.

For each RAID extent group, a rebalancing operation is performed that includes identifying, within the RAID extent group, a heavily loaded rotation group that has a high I/O load and a lightly loaded rotation group that has a low I/O load. The rebalancing operation further includes modifying the mapping between the slices in the corresponding LUN and the rotation groups in the RAID extent group such that at least one slice of the LUN that is mapped to the heavily loaded rotation group is remapped to the lightly loaded rotation group.

In some embodiments, each RAID extent group may be divided into multiple rotation groups at least in part by dividing each RAID extent group into an integral number of rotation groups, such that each rotation group is completely contained within a single one of the RAID extent groups. Host data directed to each slice is stored completely in drive extents indicated by the RAID extent entries contained in the rotation group to which the slice is mapped according to the mapping between the slices in the LUN that contains the slice and the rotation groups contained in the corresponding RAID extent group. In addition, for each LUN, the mapping between the slices in the LUN and the rotation groups contained in the corresponding RAID extent group may map multiple slices to each individual rotation group in the corresponding RAID extent group.

In some embodiments, each RAID extent group may be divided into multiple rotation groups such that no data storage drive that contains a drive extent that is indicated by any one of the RAID extent entries contained in a rotation group contains another drive extent that is indicated by any other RAID extent entry in the same rotation group.

In some embodiments, each RAID extent group may be divided into multiple rotation groups such that each one of the rotation groups contained within the same RAID extent group contains the same number of RAID extent entries.

In some embodiments, each RAID extent group may be divided into multiple rotation groups such that each rotation group contained within a RAID extent group contains a number of RAID extent entries that is equal to the total number of drives in the corresponding partnership group integer divided by the total number of drive extents indicated by each RAID extent entry.

In some embodiments, each RAID extent group may be divided into multiple rotation groups such that the set of drive extents indicated by the RAID extent entries in each rotation group includes one and only one drive extent allocated from each one of the data storage drives in the partnership group of data storage drives corresponding to the RAID extent group that contains the rotation group.

In some embodiments, an average I/O load may be calculated for each rotation group. The average I/O load for each rotation group is equal to a sum of the average numbers of I/O operations received per second for the slices that are mapped to that rotation group. An average rotation group I/O load may also be calculated for each RAID extent group. The average rotation group I/O load for each RAID extent group is equal to an average of the average I/O loads for the rotation groups contained within that RAID extent group. Identifying the heavily loaded rotation group in a RAID extent group may then be performed by identifying a rotation group having an average I/O load that exceeds the average rotation group I/O load for the RAID extent group by greater than a threshold percentage of the average rotation group I/O load for the RAID extent group. Identifying the lightly loaded rotation group in a RAID extent group may then be performed by identifying a rotation group having an average I/O load that is less than the average rotation group I/O load for the RAID extent group by greater than the threshold percentage of the average rotation group I/O load for the RAID extent group.

In some embodiments the slice of the LUN that is mapped to the heavily loaded rotation group, and that is remapped to the lightly loaded rotation group, may be a slice of the LUN that is mapped to the heavily loaded rotation group and that also has a higher average number of I/O operations received per second than any other slice of the LUN that is mapped to the heavily loaded rotation group.

In some embodiments, the rebalancing operation may further include modifying the mapping between the slices in the LUN and the rotation groups in the corresponding RAID extent group such that at least one slice that is mapped to the lightly loaded rotation group is remapped to the heavily loaded rotation group.

In some embodiments, the slice of the LUN that is mapped to the lightly loaded rotation group and that is remapped to the heavily loaded rotation group may be a slice that is mapped to the lightly loaded rotation group and that also has a lower average number of I/O operations received per second than any other slice of the LUN that is mapped to the lightly loaded rotation group.

In some embodiments, the RAID extent table may be generated at least in part by generating each RAID extent entry in the RAID extent table such that each RAID extent entry in the RAID extent table indicates the same number of drive extents.

In some embodiments, each RAID extent entry represents a RAID stripe and indicates i) a first set of drive extents that are used to persistently store host data directed to the slices that are mapped to the rotation group that contains the RAID extent entry, and ii) a second set of drive extents that are used to store parity information.

In some embodiments, the size of each LUN is a sum of the capacities of the drive extents that are indicated by the RAID extent entries in the corresponding RAID extent group that are used to persistently store the host data that is directed to the slices contained in the LUN.

In some embodiments, the data storage drives in the array may be divided into partnership groups such that each partnership group contains a number of data storage drives that does not exceed a predetermined maximum partnership group size. The maximum partnership group size may be a configuration parameter.

It will be evident to those skilled in the art that embodiments of the disclosed technology may provide significant improvements with regard to technical shortcomings of previous systems. Mapped RAID technology improves over traditional RAID in terms of supporting the addition of individual non-volatile data storage drives and reducing data rebuild times. The disclosed technology additionally improves over previous systems by providing an approach to load balancing that is effective within a mapped RAID system. The disclosed technology provides high levels of overall system performance by balancing I/O load across different system components, and increases the lifetime of solid state drives that are connected to and/or contained within data storage systems that use mapped RAID data protection by providing effective "wear leveling".

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments of the invention will now be described. It should be understood that the embodiments described below are provided only as examples, in order to illustrate various features and principles of the invention, and that the invention is broader than the specific embodiments described below.

Figure 1:
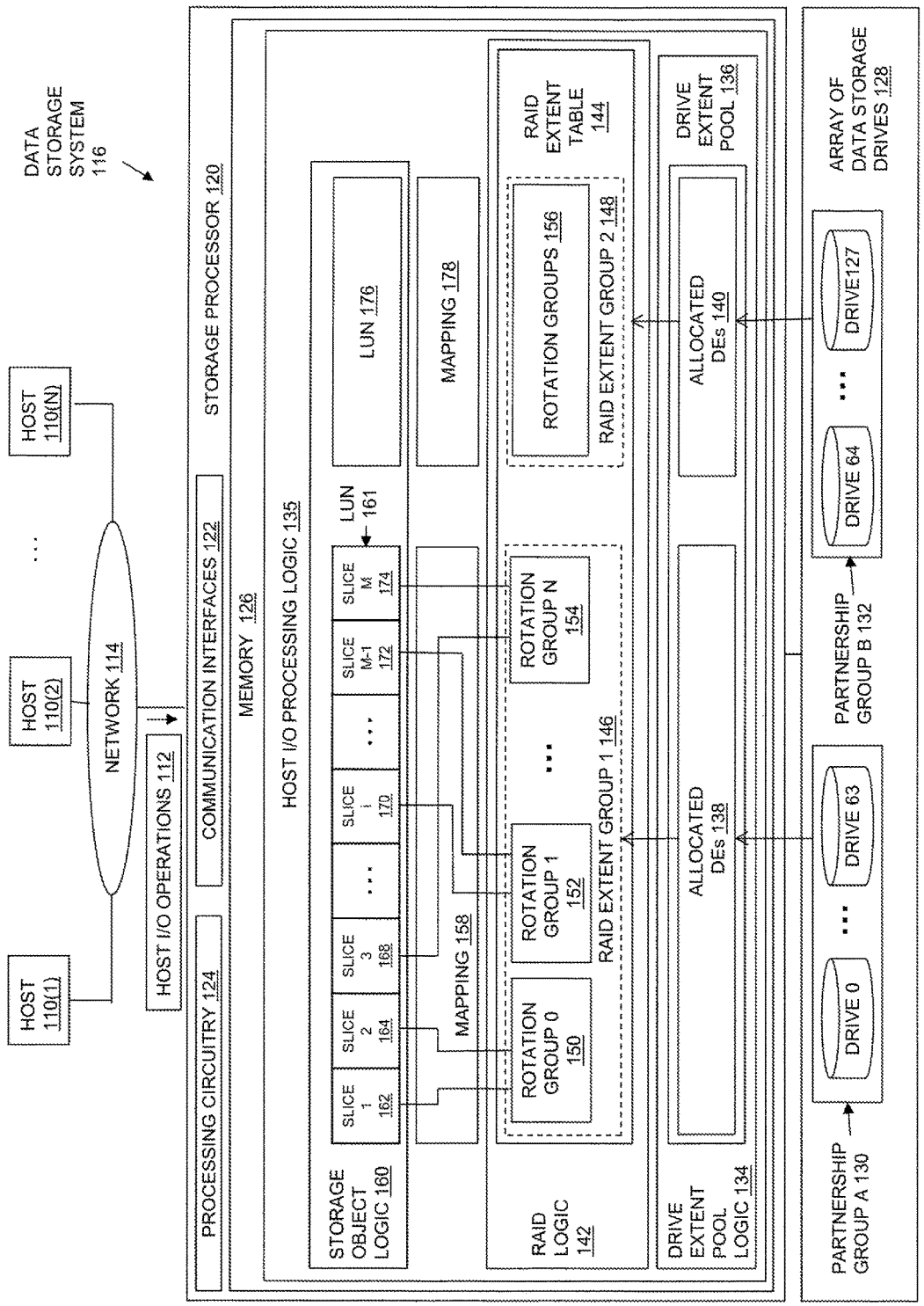
FIG. 1 is a block diagram showing an operational environment for the disclosed technology, including an example of a data storage system in which the disclosed technology may be embodied.

FIG. 1 is a block diagram showing an example of an operational environment for the disclosed technology, including an example of a data storage system in which the disclosed technology may be embodied. The data storage environment of FIG. 1 includes some number of Host Computing Devices 110, referred to as "hosts" and shown for purposes of illustration by Hosts 110(1) through 110(N), that access non-volatile data storage provided by Data Storage System 116 using Host I/O Operations 112, for example over one or more computer networks, such as a local area network (LAN), and/or a wide area network (WAN) such as the Internet, etc., shown for purposes of illustration in FIG. 1 by Network 114, and communicably coupled to Storage Processor 120 through Communication Interfaces 122. Data Storage System 116 includes at least one Storage Processor 120 and an Array of Data Storage Drives 128. Storage Processor 120 may, for example, be provided as a circuit board assembly, or "blade," which plugs into a chassis that encloses and cools multiple storage processors, and that has a backplane for interconnecting storage processors. However, no particular hardware configuration is required, and Storage Processor 120 may be embodied as any specific type of computing device capable of processing host input/output (I/O) operations received from Hosts 110 (e.g. I/O read and I/O write operations, create storage object operations, delete storage object operations, etc.).

The Array of Data Storage Drives 128 may include data storage drives such as magnetic disk drives, solid state drives, hybrid drives, and/or optical drives. Array of Data Storage Drives 128 may be directly physically connected to and/or contained within Storage Processor 120, and/or may be communicably connected to Storage Processor 120 by way of one or more computer networks, e.g. including or consisting of a Storage Area Network (SAN) or the like.

In some embodiments, Host I/O Processing Logic 135 (e.g. RAID Logic 142 and/or Drive Extent Pool Logic 134) compares the total number of data storage drives that are contained in Array of Data Storage Drives 128 to a maximum partnership group size. In response to determining that the number of data storage drives that are contained in Array of Data Storage Drives 128 exceeds a maximum partnership group size, Host I/O Processing Logic 135 divides the data storage drives in Array of Data Storage Drives 128 into multiple partnership groups, each one of which contains a total number of data storage drives that does not exceed the maximum partnership group size, and such that each data storage drive in the Array of Data Storage Drives 128 is contained in only one of the resulting partnership groups. In the example of FIG. 1, in which the maximum partnership group size is configured to 64, the 128 data storage drives in Array of Data Storage Drives 128 have been divided into two partnership groups, shown by Partnership Group A 130, which includes data storage drives 0 through 63, and Partnership Group B 132, which includes data storage drives 64 through 127.

In some embodiments, the maximum partnership group size may be configured to a value that is at least twice as large as the minimum number of data storage drives that is required to provide a specific level of RAID data protection. For example, the minimum number of data storage drives that is required to provide 4D+1P RAID-5 must be greater than five, e.g. six or more, and accordingly an embodiment or configuration that supports 4D+1P RAID-5 may configure the maximum partnership group size to a value that is twelve or greater. In another example, the minimum number of data storage drives that is required to provide 4D+2P RAID-6 must be greater than six, e.g. seven or more, and accordingly in an embodiment or configuration that supports 4D+2P RAID-6 the maximum partnership group size may be configured to a value that is fourteen or greater. By limiting the number of data storage drives contained in a given partnership group to a maximum partnership group size, the disclosed technology advantageously limits the risk that an additional disk will fail while a rebuild operation is being performed using data and parity information that is stored within the partnership group in response to the failure of a data storage drive contained in the partnership group, since the risk of an additional disk failing during the rebuild operation increases with the total number of data storage drives contained in the partnership group. In some embodiments, the maximum partnership group size may be a configuration parameter set equal to a highest number of data storage drives that can be organized together into a partnership group that maximizes the amount of concurrent processing that can be performed during a rebuild process resulting from a failure of one of the data storage drives contained in the partnership group.

Memory 126 in Storage Processor 120 stores program code that is executable on Processing Circuitry 124. Memory 126 may include volatile memory (e.g. RAM), and/or other types of memory. The Processing Circuitry 124 may, for example, include or consist of one or more microprocessors, e.g. central processing units (CPUs), multi-core processors, chips, and/or assemblies, and associated circuitry. Processing Circuitry 124 and Memory 126 together form control circuitry, which is configured and arranged to carry out various methods and functions as described herein. The Memory 126 stores a variety of software components that may be provided in the form of executable program code. For example, as shown in FIG. 1, Memory 126 may include software components such as Host I/O Processing Logic 135. When the program code is executed by Processing Circuitry 124, Processing Circuitry 124 is caused to carry out the operations of the software components. Although certain software components are shown and described for purposes of illustration and explanation, those skilled in the art will recognize that Memory 126 may include various other software components, such as an operating system, various applications, other processes, etc.

Drive Extent Pool Logic 134 generates Drive Extent Pool 136 by dividing each one of the data storage drives in the Array of Data Storage Drives 128 into multiple, equal size drive extents. Each drive extent consists of a physically contiguous range of non-volatile data storage that is located on a single drive. For example, Drive Extent Pool Logic 132 may divide each one of the data storage drives in the Array of Data Storage Drives 128 into multiple, equal size drive extents of physically contiguous non-volatile storage, and add an indication (e.g. a drive index and a drive extent index, etc.) of each one of the resulting drive extents to Drive Extent Pool 136. The size of the drive extents into which the data storage drives are divided is the same for every data storage drive. Various specific fixed sizes of drive extents may be used in different embodiments. For example, in some embodiments each drive extent may have a size of 10 gigabytes. Larger or smaller drive extent sizes may be used in alternative embodiments.

RAID Logic 142 generates the RAID Extent Table 144, which contains multiple RAID extent entries. RAID Logic 142 also allocates drive extents from Drive Extent Pool 136 to specific RAID extent entries that are contained in the RAID Extent Table 144. For example, each row of RAID Extent Table 144 may consist of a RAID extent entry which may indicate multiple drive extents, and to which multiple drive extents may be allocated.

Each RAID extent entry in the RAID Extent Table 144 indicates the same number of allocated drive extents.

Drive extents are allocated to RAID extent entries in the RAID Extent Table 144 such that no two drive extents indicated by any single RAID extent entry are located on the same data storage drive.

Each RAID extent entry in the RAID Extent Table 144 may represent a RAID stripe and indicates i) a first set of drive extents that are used to persistently store host data directed to the slices that are mapped to the rotation group that contains the RAID extent entry, and ii) a second set of drive extents that are used to store parity information. For example, in a 4D+1P RAID-5 configuration, each RAID extent entry in the RAID Extent Table 144 indicates four drive extents that are used to store host data and one drive extent that is used to store parity information. In another example, in a 4D+2P RAID-6 configuration, each RAID extent entry in the RAID Extent Table 144 indicates four drive extents that are used to store host data and two drive extents that are used to store parity information.

RAID Logic 142 also divides the RAID extent entries in the RAID Extent Table 144 into multiple RAID extent groups. Accordingly, multiple RAID extent groups of RAID extent entries are contained in the RAID Extent Table 144. In the example of FIG. 1, RAID Logic 142 divides the RAID extent entries in the RAID Extent Table 144 into RAID Extent Group 1 146 and RAID Extent Group 2 148. Each of the RAID extent groups in RAID Extent Table 144 corresponds to one of the partnership groups in the Array of Data Storage Drives 128. In the example of FIG. 1, RAID Extent Group 1 146 corresponds to Partnership Group A 130, and RAID Extent Group 2 148 corresponds to Partnership Group B 132. Drive extents from Drive Extent Pool 136 that are located on data storage drives in Partnership Group A 130 are only allocated to RAID extent entries in RAID Extent Group 1 146, as shown by Allocated Drive Extents 138. Drive extents from Drive Extent Pool 136 that are located on data storage drives in Partnership Group B 132 are only allocated to RAID extent entries in RAID Extent Group 2 148, as shown by Allocated Drive Extents 140. As a result, the RAID extent entries in each RAID extent group only indicate drive extents that are located on the data storage drives that are contained in the corresponding partnership group. Accordingly, RAID extent entries in RAID Extent Group 1 146 only indicate drive extents that are located on the data storage drives that are contained in Partnership Group A 130, and RAID extent entries in RAID Extent Group 2 148 only indicate drive extents that are located on the data storage drives that are contained in Partnership Group B 132.

Drive Extent Pool 136 may also include a set of unallocated drive extents located on data storage drives in Partnership Group A 130 and associated with RAID Extent Group 1 146, that may be allocated to RAID extent entries in RAID Extent Group 1 146 in the event of a data storage drive failure, i.e. to replace drive extents that are located on a failed data storage drive contained in Partnership Group A 130. Similarly, Drive Extent Pool 136 may also include a set of unallocated drive extents located on data storage drives in Partnership Group B 132 and associated with RAID Extent Group 2 148, that may be allocated to RAID extent entries in RAID Extent Group 2 148 in the event of a data storage drive failure, i.e. to replace drive extents that are located on a failed data storage drive contained in Partnership Group B 132.

When a drive extent is allocated to a RAID extent entry, an indication of the drive extent is stored into that RAID extent entry. For example, a drive extent allocated to a RAID extent entry may be indicated within that RAID extent entry by storing a pair of indexes "m|n" into that RAID extent entry, where "m" indicates a drive index of the data storage drive on which the drive extent is located (e.g. a numeric drive number within Array of Data Storage Drives 128, a slot number within which the physical drive located, a textual drive name, etc.), and "n" indicates an index of the drive extent within the data storage drive (e.g. a numeric drive extent number, a block offset, a sector number, etc.). For example, in embodiments in which data storage drives are indexed within Array of Data Storage Drives 128 starting with 0, and in which drive extents are indexed within the data storage drive that contains them starting with 0, a first drive extent of Drive 0 in Array of Data Storage Drives 128 may be represented by "0|0", a second drive extent within Drive 0 may be represented by "0|1", and so on.

RAID Logic 142 divides the RAID extent entries in each one of the RAID extent groups into multiple rotation groups. For example, RAID Logic 142 divides RAID Extent Group 1 146 into a set of N rotation groups made up of Rotation Group 0 150, Rotation Group 1 152, and so on through Rotation Group N 154. RAID Logic 142 also divides RAID Extent Group 2 148 into Rotation Groups 156. Each RAID extent group may be divided into an integral number of rotation groups, such that each individual rotation group is completely contained within a single one of the RAID extent groups. Each individual RAID extent entry is contained in only one rotation group. Within a RAID extent group, each rotation group contains the same number of RAID extent entries. Accordingly, each one of the N rotation groups made up of Rotation Group 0 150, Rotation Group 1 152, through Rotation Group N 154 in RAID Extent Group 1 146 contains the same number of RAID extent entries. Similarly, each one of the rotation groups in Rotation Groups 156 contains the same number of RAID extent entries.

Storage Object Logic 160 generates at least one corresponding logical unit (LUN) for each one of the RAID extent groups in RAID Extent Table 144. In the example of FIG. 1, Storage Object Logic 160 generates LUN 161 corresponding to RAID Extent Group 1 146, and LUN 176 corresponding to RAID Extent Group 2 148. While for purposes of concise illustration FIG. 1 shows only one LUN generated per RAID extent group, the technology disclosed herein is not limited to such embodiments or configurations, and alternatively multiple LUNs may be generated for each RAID extent group.

Each one of the LUNs generated by Storage Object Logic 160 is made up of multiple, equal sized slices. Each slice in a LUN represents an addressable portion of the LUN, through which non-volatile storage indicated by RAID extent entries in the corresponding RAID extent group is accessed. For example, each slice of a LUN may represent some predetermined amount of the LUN's logical address space. For example, each slice may span some predetermined amount of the LUN's logical address space, e.g. 256 megabytes, 512 megabytes, one gigabyte, or some other specific amount of the LUN's logical address space.

For example, as shown in FIG. 1, LUN 161 may be made up of M equal sized slices, shown for purposes of illustration including Slice 1 162, Slice 2 164, Slice 3 168, and so on through Slice i 170, and so on through Slice M 174. For example, where a logical block address space of LUN 161 contains logical blocks numbered from 1 to x, Slice 1 162 consists of logical block 1 through logical block k (where k is the number of logical blocks in each slice), Slice 2 164 consists of logical block k+1 through logical block 2k, and so on through Slice M 174, which consists of logical block (x−k)+1 through logical block x.

The Storage Object Logic 160 uses individual slices of LUN 161 and LUN 176 to access the non-volatile storage that is to be used to store host data when processing write I/O operations within Host I/O operations 112, and from which host data is to be read when processing read I/O operations within Host I/O operations 112. For example, non-volatile storage may be accessed through specific slices of LUN 161 and/or LUN 176 in order to support one or more storage objects (e.g. other logical disks, file systems, etc.) that are exposed to Hosts 110 by Data Storage System 116. Alternatively, slices within LUN 161 and/or LUN 176 may be exposed directly to write I/O operations and/or read I/O operations contained within Host I/O operations 112.

For each one of LUNs 161 and 176, all host data that is directed to each individual slice in the LUN is completely stored in the drive extents that are indicated by the RAID extent entries contained in a rotation group to which the slice is mapped according to a mapping between the slices in the LUN and the rotation groups in the RAID extent group corresponding to the LUN. For example, Mapping 158 maps each slice in LUN 161 to a rotation group in RAID Extent Group 1 146. Accordingly, all host data in write I/O operations directed to a specific slice in LUN 161 is completely stored in drive extents that are indicated by the RAID extent entries contained in a rotation group in RAID Extent Group 1 146 to which that slice is mapped according to Mapping 158.

Mapping 178 maps each slice in LUN 176 to a rotation group in RAID Extent Group 2 148. Accordingly, all host data in write I/O operations directed to a specific slice in LUN 176 is completely stored in drive extents that are indicated by the RAID extent entries contained in a rotation group in RAID Extent Group 2 148 to which that slice is mapped according to Mapping 158.

In some embodiments, multiple slices may be mapped to individual rotation groups, and the host data directed to all slices that are mapped to an individual rotation group is stored on drive extents that are indicated by the RAID extent entries contained in that rotation group.

In some embodiments, storing host data in write I/O operations directed to a specific slice into the drive extents that are indicated by the RAID extent entries contained in the rotation group to which that slice is mapped may include striping portions (e.g. blocks) of the host data written to the slice across the drive extents indicated by one or more of the RAID extent entries contained in the rotation group, e.g. across the drive extents indicated by one or more of the RAID extent entries contained in the rotation group that are used to store data. Accordingly, for example, in a 4D+1P RAID-5 configuration, the disclosed technology may operate by segmenting the host data directed to a given slice into sequential blocks, and storing consecutive blocks of the slice onto different ones of the drive extents used to store data that are indicated by one or more of the RAID extent entries contained in the rotation group to which the slice is mapped.

The size of each LUN generated by Storage Object Logic 160 is a sum of the capacities of the drive extents that are indicated by the RAID extent entries in the corresponding RAID extent group that are used to persistently store host data that is directed to the slices contained in the LUN. For example, the size of LUN 161 is a sum of the capacities of the drive extents that are indicated by the RAID extent entries in RAID Extent Group 1 146 and that are used to store host data that is directed to the slices contained in LUN 161.

For each RAID extent group in RAID Extent Table 144, Storage Object Logic 160 and/or RAID Logic 142 performs a rebalancing operation that may modify the mapping between the rotation groups in the RAID extent group and the slices in the corresponding LUN in order to improve load balancing. For example, Storage Object Logic 160 and/or RAID Logic 142 may periodically perform a rebalancing operation for RAID Extent Group 1 146 and LUN 161 that may modify Mapping 158, and a rebalancing operation for RAID Extent Group 2 148 and LUN 176 that may modify Mapping 178.

In an example of a rebalancing operation performed on RAID Extent Group 1 146, a heavily loaded rotation group is identified within RAID Extent Group 146. The heavily loaded rotation group identified within RAID Extent Group 1 146 has a relatively high I/O operation load with respect to the other rotation groups within RAID Extent Group 1 146. A lightly loaded rotation group is also identified within RAID Extent Group 1 146. The lightly loaded rotation group identified within RAID Extent Group 1 146 has a relatively low I/O operation load with respect to the other rotation groups within RAID Extent Group 1 146. The rebalancing operation performed for RAID Extent Group 146 further includes modifying the Mapping 158 between the slices in the corresponding LUN 161 and the rotation groups in RAID Extent Group 1 146 such that at least one slice of LUN 161 that is mapped to the heavily loaded rotation group in RAID Extent Group 146 is remapped to the lightly loaded rotation group in RAID Extent Group 146. As a result of remapping the slice in LUN 161 from the heavily loaded rotation group to the lightly loaded rotation group, host data previously directed to the recapped slice that was previously stored in drive extents indicated by the RAID extent entries contained in the heavily loaded rotation group is moved from drive extents indicated by the RAID extent entries contained in the heavily loaded rotation group to drive extents indicated by the RAID extent entries contained in the lightly loaded rotation group. Further as a result of the remapping the slice in LUN 161 from the heavily loaded rotation group to the lightly loaded rotation group, host data received in subsequently received write I/O operations directed to the slice is stored in drive extents indicated by the RAID extent entries contained in the lightly loaded rotation group. In addition, subsequent read I/O operations that are directed to the slice result in host data being read from drive extents indicated by the RAID extent entries that are contained in the lightly loaded rotation group.

In some embodiments, RAID Logic 142 may divide each RAID extent group in RAID Extent Table 144 into multiple rotation groups such that no data storage drive that contains a drive extent that is indicated by any one of the RAID extent entries contained in a rotation group contains another drive extent that is indicated by any other RAID extent entry in the same rotation group. For example, in such embodiments, RAID Logic 142 would divide RAID Extent Group 1 146 into multiple rotation groups such that for each rotation group in RAID Extent Group 1 146, no individual data storage drive in Partnership Group A 130 contains more than one drive extent that is indicated by the set of RAID extent entries contained in that rotation group.

In some embodiments, RAID Logic 142 may divide each RAID extent group in RAID Extent Table 144 into multiple rotation groups such that each one of the rotation groups contained within the same RAID extent group contains the same number of RAID extent entries.

In some embodiments, each RAID Logic 142 may divide each RAID extent group in RAID Extent Table 144 into multiple rotation groups such that each one of the rotation groups contained within any given RAID extent group contains a number of RAID extent entries that is equal to the total number of drives in the partnership group integer corresponding to that RAID extent group divided by the total number of drive extents indicated by each RAID extent entry. For example, in a configuration in which a partnership group contains thirteen data storage drives, and in which each RAID extent entry in the RAID extent table indicates five drive extents (e.g. as in a 4D+1P RAID-5 configuration), then thirteen integer divided by five is equal to two, and accordingly RAID Logic 142 would divides the RAID extent entries in the RAID extent group corresponding to that partnership group into rotation groups that each contain two RAID extent entries.

In some embodiments, each RAID Logic 142 may divide each RAID extent group in RAID Extent Table 144 into multiple rotation groups such that the set of drive extents indicated by the RAID extent entries in each rotation group includes one and only one drive extent allocated from each one of the data storage drives in the partnership group of data storage drives corresponding to the RAID extent group that contains the rotation group. For example, in a configuration in which a partnership group contains ten data storage drives, and in which each RAID extent entry in the RAID extent table indicates five drive extents (e.g. as in a 4D+1P RAID-5 configuration), then RAID Logic 142 may divide the RAID extent entries in the RAID extent group corresponding to that partnership group into rotation groups that each contain two RAID extent entries, and where the set of drive extents indicated by the RAID extent entries in each rotation group includes one drive extent from each one of the data storage drives in the partnership group.

In some embodiments, Storage Object Logic 160 and/or RAID Logic 142 may maintain an average number of I/O operations (e.g. write I/O operations received per second, or read I/O operations and write I/O operations received per second) that are directed to each individual slice of each LUN. For example, an average number of I/O operations may be maintained for each slice in LUN 161. In such embodiments, an average I/O load may be calculated for each rotation group by Storage Object Logic 160 and/or RAID Logic 142 that is equal to a sum of the averages of the number of I/O operations received per second for all of the slices that are mapped to that rotation group. For example, an average I/O load may be calculated for Rotation Group 0 150 in that is the sum of i) the average number of I/O operations received per second for Slice 1 162 and ii) the average number of I/O operations received per second for Slice 2 164 in LUN 161. Similarly, an average I/O load may be calculated for Rotation Group 1 152 that is the sum of i) the average number of I/O operations received per second for Slice i 170 and ii) the average number of I/O operations received per second for Slice M−1 172 in LUN 161.

Storage Object Logic 160 and/or RAID Logic 142 may also calculate an average rotation group I/O load for each RAID extent group. The average rotation group I/O load for each RAID extent group is equal to an average of the average I/O loads for the rotation groups contained within that RAID extent group. For example, the average rotation group I/O load for RAID Extent Group 1 146 may be equal to an average of the average I/O loads for the rotation groups shown by Rotation Group 0 150, Rotation Group 1 152, and so on through Rotation Group N 154.

Storage Object Logic 160 and/or RAID Logic 142 may identify the heavily loaded rotation group within a RAID extent group by identifying a rotation group having an average I/O load that exceeds the average rotation group I/O load for the RAID extent group by greater than a threshold percentage of the average rotation group I/O load for the RAID extent group. For example, Storage Object Logic 160 and/or RAID Logic 142 may identify the heavily loaded rotation group within RAID Extent Group 1 146 by identifying one of Rotation Group 0 150, Rotation Group 1 152, through Rotation Group N 154 that has an average I/O load that exceeds the average rotation group I/O load for RAID Extent Group 1 146 by greater than ten percent of the average rotation group I/O load for the rotation groups in RAID Extent Group 1 146.

In some embodiments, Storage Object Logic 160 and/or RAID Logic 142 may identify the lightly loaded rotation group within a RAID extent group by identifying a rotation group having an average I/O load that is less than the average rotation group I/O load for the RAID extent group by more than the threshold percentage of the average rotation group I/O load for the RAID extent group. For example, Storage Object Logic 160 and/or RAID Logic 142 may identify the lightly loaded rotation group within RAID Extent Group 1 146 by identifying one of Rotation Group 0 150, Rotation Group 1 152, through Rotation Group N 154 that has an average I/O load that is less than the average rotation group I/O load for RAID Extent Group 1 146 by an amount that is more than ten percent of the average rotation group I/O load for the rotation groups in RAID Extent Group 1 146.

In some embodiments the slice of the LUN that is mapped to the heavily loaded rotation group, and that is remapped by Storage Object Logic 160 and/or RAID Logic 142 to the lightly loaded rotation group, may be a slice of the LUN that is mapped to the heavily loaded rotation group and that also has a higher average number of I/O operations received per second than any other slice of the LUN that is mapped to the heavily loaded rotation group.

In some embodiments, the rebalancing operation performed by Storage Object Logic 160 and/or RAID Logic 142 may further include modifying the mapping between the slices in the LUN and the rotation groups in the corresponding RAID extent group such that at least one slice that is mapped to the lightly loaded rotation group is remapped to the heavily loaded rotation group. For example, a rebalancing operation performed by Storage Object Logic 160 and/or RAID Logic 142 with regard to RAID Extent Group 1 146 may include modifying the Mapping 158 between the slices in the LUN 161 and the rotation groups in RAID Extent Group 146 such that at least one slice of LUN 161 that is mapped to the lightly loaded rotation group in RAID Extent Group 146 is remapped to the heavily loaded rotation group in RAID Extent Group 146. As a result of remapping the slice in LUN 161 from the lightly loaded rotation group to the heavily loaded rotation group, host data previously directed to the remapped slice that was previously stored in drive extents indicated by the RAID extent entries contained in the lightly loaded rotation group is moved from drive extents indicated by the RAID extent entries contained in the lightly loaded rotation group to drive extents indicated by the RAID extent entries contained in the heavily loaded rotation group. Further as a result of the remapping the slice in LUN 161 from the lightly loaded rotation group to the heavily loaded rotation group, host data received in subsequently received write I/O operations directed to the slice is stored in drive extents indicated by the RAID extent entries contained in the heavily loaded rotation group. In addition, subsequent read I/O operations that are directed to the slice result in host data being read from drive extents indicated by the RAID extent entries that are contained in the heavily loaded rotation group.

In some embodiments, the slice of the LUN that is mapped to the lightly loaded rotation group and that is remapped by Storage Object Logic 160 and/or RAID Logic 142 to the heavily loaded rotation group may be a slice that is mapped to the lightly loaded rotation group and that also has a lower average number of I/O operations received per second than any other slice of the LUN that is mapped to the lightly loaded rotation group. For example, the slice of the LUN 161 that is mapped to the lightly loaded rotation group in RAID Extent Group 1 146 and that is remapped by Storage Object Logic 160 and/or RAID Logic 142 to the heavily loaded rotation group in RAID Extent Group 1 146 may be a slice that is mapped to the lightly loaded rotation group and that also has a lower average number of I/O operations received per second than any other slice of the LUN 161 that is mapped to the lightly loaded rotation group in RAID Extent Group 1 146.

Figure 2:
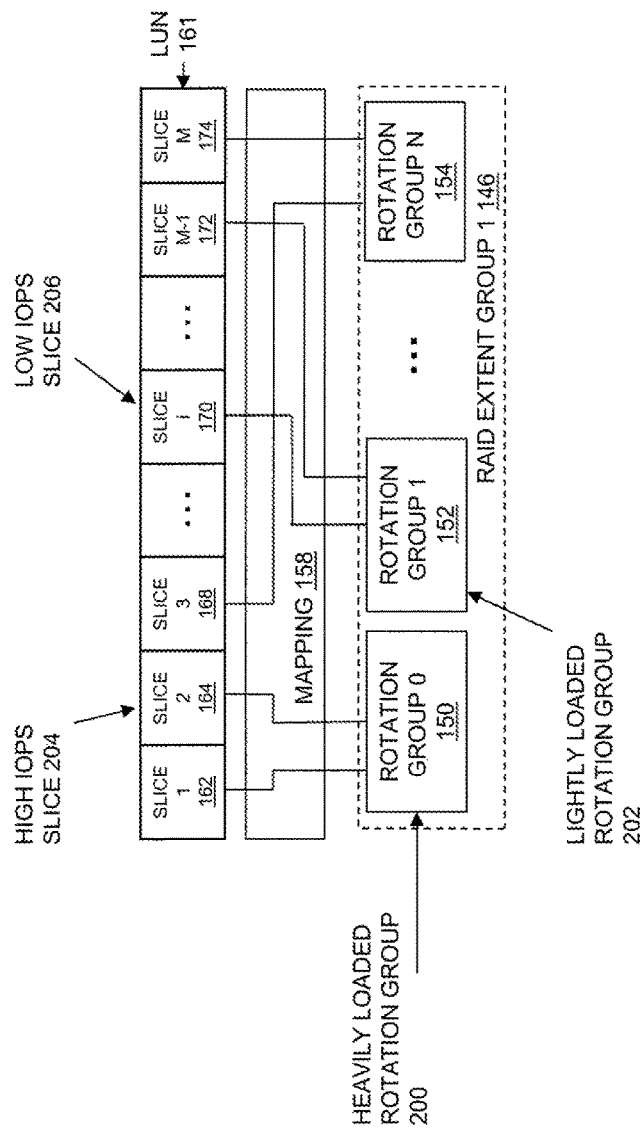
FIG. 2 is a block diagram showing an example of a LUN and a corresponding RAID extent group, and a mapping between slices of the LUN and rotation groups in the RAID extent group, in which a heavily loaded rotation group, lightly loaded rotation group, high IOPS slice and low IOPS slice have been identified.

FIG. 2 is a block diagram showing an example of the LUN 161 and corresponding RAID Extent Group 1 146, and a Mapping 158 between slices of the LUN 161 and rotation groups in the RAID Extent Group 1 146, in which a heavily loaded rotation group, lightly loaded rotation group, high IOPS slice and low IOPS slice have been identified. In the example of FIG. 2, while performing a rebalancing operation on RAID Extent Group 1 146, Storage Object Logic 160 and/or RAID Logic 142 has identified Rotation Group 0 150 as Heavily Loaded Rotation Group 200. Storage Object Logic 160 and/or Logic 142 has also identified Rotation Group 1 152 as Lightly Loaded Rotation Group 202. For example, Storage Object Logic 160 and/or RAID Logic 142 may have identified Rotation Group 0 150 as Heavily Loaded Rotation Group 200 by i) calculating an average I/O load for Rotation Group 0 150 that is equal to a sum of the average number of I/O operations received per second for Slice 1 162 and the average number of I/O operations received per second for Slice 2 164, ii) comparing the resulting average I/O load for Rotation Group 0 150 to the average rotation group I/O load calculated across all the rotation groups in RAID Extent Group 1 146, and iii) identifying Rotation Group 0 150 as Heavily Loaded Rotation 200 in response to determining that the average I/O load for Rotation Group 0 150 exceeds the average rotation group I/O load calculated across all the rotation groups in RAID Extent Group 1 146 by more than a threshold difference value (e.g. by more than ten percent of the average rotation group I/O load calculated across all the rotation groups in RAID Extent Group 1 146). Storage Object Logic 160 and/or RAID Logic 142 may have identified Rotation Group 1 152 as Lightly Loaded Rotation Group 202 by i) calculating an average I/O load for Rotation Group 1 152 that is equal to a sum of the average number of I/O operations received per second for Slice i 170 and the average number of I/O operations received per second for Slice M−1 172, ii) comparing the resulting average I/O load for Rotation Group 1 152 to the average rotation group I/O load calculated across all the rotation groups in RAID Extent Group 1 146, and iii) identifying Rotation Group 1 152 as Lightly Loaded Rotation Group 202 in response to determining that the average I/O load for Rotation Group 1 152 is less than the average rotation group I/O load calculated across all the rotation groups in RAID Extent Group 1 146 by an amount that is greater than a threshold difference value (e.g. by more than ten percent of the average rotation group I/O load calculated across all the rotation groups in RAID Extent Group 1 146).

Further in FIG. 2, Storage Object Logic 160 and/or RAID Logic 142 has identified Slice 2 164 as the High IOPS Slice 204. Storage Object Logic 160 and/or RAID Logic 142 has identified Slice i 170 as the Low IOPS Slice 206. For example, Storage Object Logic 160 and/or RAID Logic 142 may identify Slice 2 164 as the High IOPS Slice 204 by monitoring the numbers of I/O operations received by each individual slice in LUN 161, calculating an average I/O per second (IOPS) for each slice in LUN 161, and identifying Slice 2 164 as High IOPS Slice 204 in response to detecting that Slice 2 164 has the highest average IOPS of any slice mapped to the Heavily Loaded Rotation Group 200. Storage Object Logic 160 and/or RAID Logic 142 may identify Slice i 170 as the Low TOPS Slice 206 by i) monitoring the numbers of I/O operations received by each individual slice in LUN 161, ii) calculating an average I/O per second (IOPS) for each slice in LUN 161, and iii) identifying Slice i 170 as Low IOPS Slice 206 in response to detecting that Slice i 170 has the lowest average IOPS of any slice mapped to the Lightly Loaded Rotation Group 202.

Figure 3:
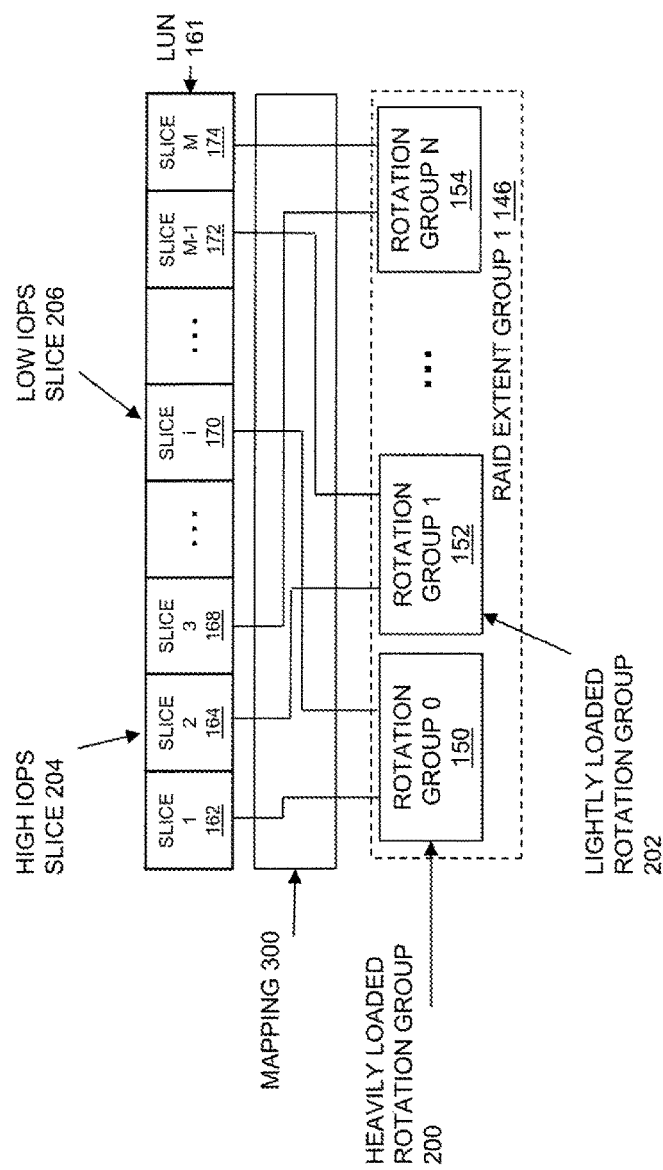
FIG. 3 is a block diagram showing the structure shown in the example of FIG. 2 after completion of a rebalancing operation that recapped the high IOPS slice to the lightly loaded rotation group and the low TOPS slice to the heavily loaded rotation group.

FIG. 3 is a block diagram showing the structure shown in the example of FIG. 2 after completion of a rebalancing operation that remapped the High IOPS Slice 204 (Slice 2 164) to the Lightly Loaded Rotation Group 202, and that remapped the Low TOPS Slice 206 (Slice i 170) to the Heavily Loaded Rotation Group 200, thus replacing the previous Mapping 158 shown in FIG. 2 with the modified Mapping 300 shown in FIG. 3. As a result of replacing Mapping 158 with Mapping 300, host data previously directed to High TOPS Slice 204 (Slice 2 164) that was previously stored in drive extents indicated by the RAID extent entries contained in the Heavily Loaded Rotation Group 200 (Rotation Group 0 150) is moved from drive extents indicated by the RAID extent entries contained in the Heavily Loaded Rotation Group 200 (Rotation Group 0 150) to drive extents indicated by the RAID extent entries contained in the Lightly Loaded Rotation Group 202 (Rotation Group 1 152). Further as a result of the replacing Mapping 158 with Mapping 300, host data received in subsequently received write I/O operations directed to High IOPS Slice 204 (Slice 2 164) is stored in drive extents indicated by the RAID extent entries contained in the Lightly Loaded Rotation Group 202 (Rotation Group 1 152). In addition, subsequent read I/O operations that are directed to High IOPS Slice 204 (Slice 2 164) result in host data being read from drive extents indicated by the RAID extent entries that are contained in the Lightly Loaded Rotation Group 202 (Rotation Group 1 152).

Further as a result of replacing Mapping 158 with Mapping 300, host data previously directed to Low IOPS Slice 206 (Slice i 170) that was previously stored in drive extents indicated by the RAID extent entries contained in the Lightly Loaded Rotation Group 202 (Rotation Group 1 152) is moved from drive extents indicated by the RAID extent entries contained in the Lightly Loaded Rotation Group 202 (Rotation Group 1 152) to drive extents indicated by the RAID extent entries contained in the Heavily Loaded Rotation Group 200 (Rotation Group 0 150). Further as a result of the replacing Mapping 158 with Mapping 300, host data received in subsequently received write I/O operations directed to Low IOPS Slice 206 (Slice i 170) is stored in drive extents indicated by the RAID extent entries contained in the Heavily Loaded Rotation Group 200 (Rotation Group 0 150). In addition, subsequent read I/O operations that are directed to Low IOPS Slice 206 (Slice i 170) result in host data being read from drive extents indicated by the RAID extent entries that are contained in the Heavily Loaded Rotation Group 200 (Rotation Group 0 150).

Figure 4:
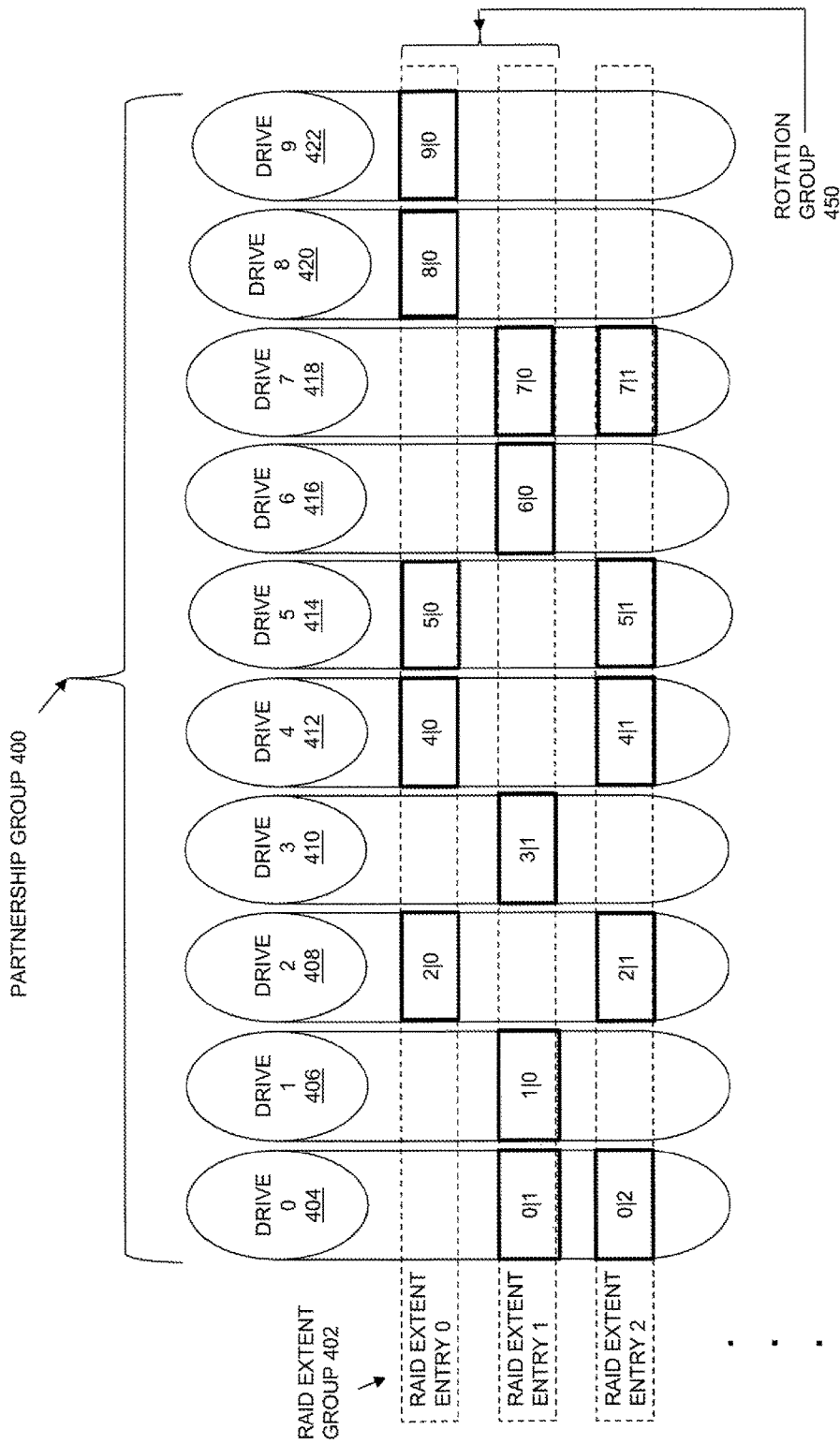
FIG. 4 is a block diagram showing an example of a partnership group of data storage drives, a RAID extent group of RAID extent entries, and a rotation group of RAID extent entries within the RAID extent group.

FIG. 4 is a block diagram showing an example of a Partnership Group of Data Storage Drives 400, a RAID extent group 402 of RAID extent entries, and an example of a Rotation Group 450 of RAID extent entries contained within the RAID Extent Group 402. As shown in FIG. 4, each RAID extent entry indicates five drive extents, and the total number of data storage drives in Partnership Group 400 is ten. Accordingly, the number of RAID extent entries in each rotation group in RAID Extent Group 402 is two, as is shown by Rotation Group 450, which includes RAID Extent Entry 0 and RAID Extent Entry 1. Also in the example of FIG. 4, the set of drive extents indicated by each rotation group in RAID Extent Group 402 indicates one and only one drive extent from each one of the data storage drives in Partnership Group 400, as is also shown by Rotation Group 450, which indicates one drive extent located on each one of the data storage drives in Partnership Group 400. While for purposes of concise illustration only one rotation group Rotation Group 450 is shown in FIG. 4, that contains RAID Extent Entry 0 and RAID Extent Entry 1, RAID Extent Group 402 includes multiple rotation groups made up of other sets of two RAID extent entries contained in RAID Extent Group 402. Moreover, while for purposes of concise illustration only the three initial RAID extent entries are shown in RAID Extent Group 402, e.g. RAID Extent Entry 0, RAID Extent Entry 1, and RAID Extent Entry 2, RAID Extent Group 402 includes some number of other RAID extent entries up to some total number of RAID extent entries that are contained in RAID Extent Group 402. Accordingly, RAID Extent Group 402 includes a first RAID Extent Entry 0, a second RAID Extent Entry 1, a third RAID Extent Entry 2, and so on for some total number of RAID extents in RAID Extent Group 402.

The RAID Extent Group 402 may be contained in a RAID extent table in embodiments or configurations that provide mapped 4D+1P RAID-5 striping and data protection. Accordingly, within each RAID extent entry in RAID Extent Group 402, four of the five indicated drive extents are used to store host data, and one of the five indicated drive extents is used to store parity information.

RAID Extent Entry 0 is shown for purposes of illustration indicating a first drive extent 2|0, which is the first drive extent in Data Storage Drive 2 408, a second drive extent 4|0, which is the first drive extent in Data Storage Drive 4 412, a third drive extent 5|0, which is the first drive extent in Data Storage Drive 5 414, a fourth drive extent 8|0, which is the first drive extent in Data Storage Drive 8 420, and a fifth drive extent 9|0, which is the first drive extent in Data Storage Drive 9 422.

RAID Extent Entry 1 is shown for purposes of illustration indicating a first drive extent 0|1, which is the second drive extent in Data Storage Drive 0 404, a second drive extent 1|0, which is the first drive extent in Data Storage Drive 1 406, a third drive extent 3||, which is the second drive extent in Data Storage Drive 3 410, a fourth drive extent 6|0, which is the first drive extent in Data Storage Drive 6 416, and a fifth drive extent 7|0, which is the first drive extent in Data Storage Drive 7 418.

RAID Extent Entry 2 is shown for purposes of illustration indicating a first drive extent 0|2, which is the third drive extent in Data Storage Drive 0 404, a second drive extent 2|1, which is the second drive extent in Data Storage Drive 2 408, a third drive extent 4|1, which is the second drive extent in Data Storage Drive 4 412, a fourth drive extent 5|1, which is the second drive extent in Data Storage Drive 5 414, and a fifth drive extent 7|1, which is the second drive extent in Data Storage Drive 7 418.

Figure 5:
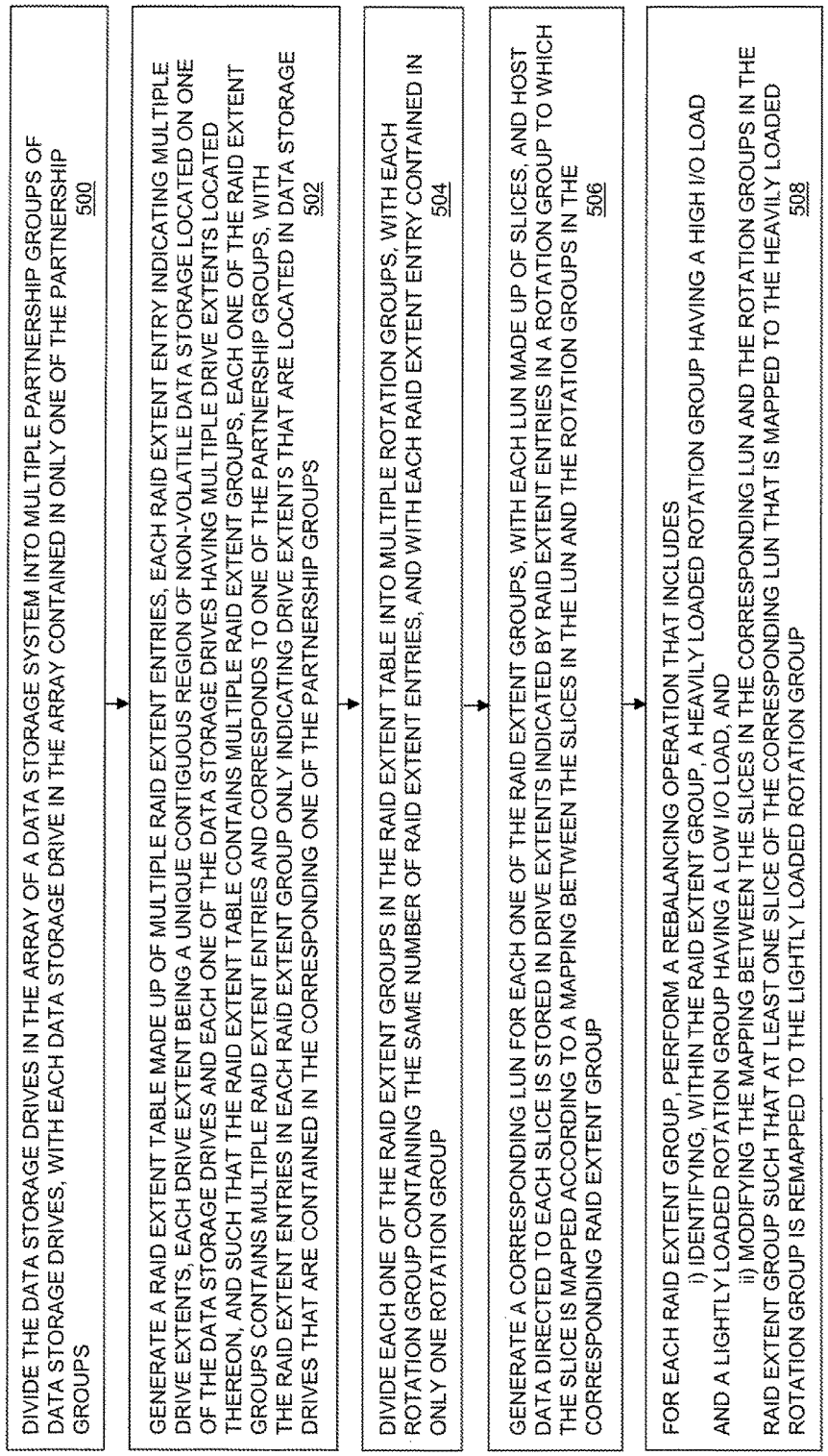
FIG. 5 is a flow chart of steps performed in some embodiments to accomplish load balancing in a data storage system that provides mapped RAID data protection.

FIG. 5 is a flow chart of steps performed in some embodiments to accomplish load balancing in a data storage system that provides mapped RAID data protection. The steps of FIG. 5 may, for example, be performed in some embodiments by the Host I/O Processing Logic 135 shown in FIG. 1.

At step 500, the data storage drives in an array of data storage drives that are contained within or communicably coupled to a data storage system are divided into multiple partnership groups of data storage drives. Each data storage drive in the array is contained in only one of the resulting partnership groups.

At step 502, a RAID extent table is generated that is made up of multiple RAID extent entries. Each RAID extent entry in the RAID extent table indicates multiple drive extents, and each drive extent is a unique contiguous region of non-volatile data storage located on one of the data storage drives. Each one of the data storage drives has multiple drive extents located thereon. The RAID extent table contains multiple RAID extent groups. Each one of the RAID extent groups contains multiple RAID extent entries, and corresponds to one of the partnership groups. The RAID extent entries in each RAID extent group only indicate drive extents that are located in data storage drives that are contained in the corresponding one of the partnership groups.

At step 504, each one of the RAID extent groups in the RAID extent table are divided into multiple rotation groups. Each rotation group contains the same number of RAID extent entries, and each RAID extent entry is contained in only one rotation group.

At step 506, a corresponding LUN is generated for each one of the RAID extent groups. Each LUN is made up of slices, and host data directed to each slice is stored in drive extents that are indicated by RAID extent entries contained in a rotation group to which the slice is mapped according to a mapping between the slices in the LUN and the rotation groups in the corresponding RAID extent group. Alternatively, step 506 may generate multiple LUNs for a RAID extent group. The mapping of slices of an individual one of the multiple LUNs may be limited to a disjoint subset of the rotation groups contained in the corresponding RAID extent group. Accordingly, in some embodiments, in the case where multiple LUNs are generated for a RAID extent group, slices from any individual one of the LUNs generated for the RAID extent group are only mapped to a set of the rotation groups in the RAID extent group that is disjoint from any other set of rotation groups in the RAID extent group to which slices can be mapped from any other one of the LUNs generated for that RAID extent group.

At step 508, for each RAID extent group, a rebalancing operation is performed that includes i) identifying, within the RAID extent group, a heavily loaded rotation group having a high I/O load and a lightly loaded rotation group having a low I/O load, and ii) modifying the mapping between the slices in the corresponding LUN and the rotation groups in the RAID extent group such that at least one slice of the corresponding LUN that is mapped to the heavily loaded rotation group is remapped to the lightly loaded rotation group. Likewise, a slice of the corresponding LUN that is mapped to the lightly loaded rotation group may be remapped to the heavily loaded rotation group.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, without limitation, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms, including without limitation: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method of performing load balancing in a data storage system while providing mapped RAID (Redundant Array of Independent Disks) data protection, wherein the data storage system includes at least one storage processor and an array of data storage drives communicably coupled to the storage processor, the method comprising:

dividing the data storage drives in the array into a plurality of partnership groups of data storage drives, wherein each data storage drive in the array is contained in only one of the partnership groups;

generating a RAID extent table, wherein the RAID extent table contains a plurality of RAID extent entries, wherein each RAID extent entry contained in the RAID extent table indicates a plurality of drive extents, wherein each drive extent comprises a unique contiguous region of non-volatile data storage located on one of the data storage drives and each one of the data storage drives has multiple drive extents located thereon, wherein the RAID extent table contains a plurality of RAID extent groups, wherein each one of the RAID extent groups contains a plurality of RAID extent entries and corresponds to one of the partnership groups, and wherein the RAID extent entries in each RAID extent group only indicate drive extents that are located in data storage drives contained in the corresponding one of the partnership groups;

dividing each RAID extent group into a plurality of rotation groups, wherein each rotation group contains the same number of RAID extent entries, and wherein each RAID extent entry is contained in only one rotation group;

generating at least one corresponding logical unit (LUN) for each one of the RAID extent groups, wherein each LUN is made up of a plurality of slices, wherein host data directed to each slice is stored in drive extents indicated by RAID extent entries in a rotation group to which the slice is mapped according to a mapping between the slices in the LUN and the rotation groups in the corresponding RAID extent group; and for each RAID extent group, performing a rebalancing operation that includes i) identifying, within the RAID extent group, a heavily loaded rotation group having a high I/O load and a lightly loaded rotation group having a low I/O load, and ii) modifying the mapping between the slices in the corresponding LUN and the rotation groups in the RAID extent group such that at least one slice of the corresponding LUN that is mapped to the heavily loaded rotation group is remapped to the lightly loaded rotation group.

2. The method of performing load balancing as in claim 1, wherein dividing each RAID extent group into a plurality of rotation groups further comprises dividing each RAID extent group into an integral number of rotation groups;

wherein the host data directed to each slice is stored completely in drive extents indicated by the RAID extent entries contained in the rotation group to which the slice is mapped according to the mapping between the slices in the LUN that contains the slice and the rotation groups contained in the RAID extent group corresponding to the LUN that contains the slice; and wherein for each LUN the mapping between the slices in the LUN and the rotation groups contained in the corresponding RAID extent group maps multiple slices to each rotation group in the corresponding RAID extent group.

3. The method of performing load balancing as in claim 2, wherein dividing each RAID extent group into a plurality of rotation groups further comprises dividing each RAID extent group into a plurality of rotation groups such that no data storage drive that contains a drive extent that is indicated by any one of the RAID extent entries contained in a rotation group contains another drive extent that is indicated by any other RAID extent entry in the same rotation group.

4. The method of performing load balancing as in claim 3, wherein dividing each RAID extent group into a plurality of rotation groups further comprises dividing each RAID extent group into a plurality of rotation groups such that each one of the rotation groups contained within the same RAID extent group contains the same number of RAID extent entries.

5. The method of performing load balancing as in claim 4, wherein dividing each RAID extent group into a plurality of rotation groups further comprises dividing each RAID extent group into a plurality of rotation groups such that each rotation group contained within a RAID extent group contains a number of RAID extent entries that is equal to the total number of drives in the corresponding partnership group integer divided by the total number of drive extents indicated by each RAID extent entry.

6. The method of performing load balancing as in claim 4, wherein dividing each RAID extent group into a plurality of rotation groups further comprises dividing each RAID extent group into a plurality of rotation groups such that the set of drive extents indicated by the RAID extent entries in each rotation group includes one and only one drive extent allocated from each one of the data storage drives in the partnership group of data storage drives corresponding to the RAID extent group that contains the rotation group.

7. The method of performing load balancing as in claim 5, further comprising:

calculating an average I/O load for each rotation group, wherein the average I/O load for each rotation group is equal to a sum of the average numbers of I/O operations received per second for the slices mapped to that rotation group;

calculating an average rotation group I/O load for each RAID extent group that is equal to an average of the average I/O loads for the rotation groups contained within that RAID extent group;

wherein identifying the heavily loaded rotation group in the RAID extent group comprises identifying a rotation group having an average I/O load that exceeds the average rotation group I/O load for the RAID extent group by greater than a threshold percentage of the average rotation group I/O load for the RAID extent group; and wherein identifying the lightly loaded rotation group in the RAID extent group comprises identifying a rotation group having an average I/O load that is less than the average rotation group I/O load for the RAID extent group by greater than the threshold percentage of the average rotation group I/O load for the RAID extent group.

8. The method of performing load balancing as in claim 7, wherein the at least one slice of the LUN that is mapped to the heavily loaded rotation group that is remapped to the lightly loaded rotation group comprises a slice of the LUN that is mapped to the heavily loaded rotation group that has a higher average number of I/O operations received per second than any other slice of the LUN that is mapped to the heavily loaded rotation group.

9. The method of performing load balancing as in claim 8, wherein the rebalancing operation further comprises modifying the mapping between the slices in the corresponding LUN and the rotation groups in the RAID extent group such that at least one slice of the LUN that is mapped to the lightly loaded rotation group is remapped to the heavily loaded rotation group.

10. The method of performing load balancing as in claim 9, wherein the at least one slice of the LUN that is mapped to the lightly loaded rotation group that is remapped to the heavily loaded rotation group comprises a slice of the LUN that is mapped to the lightly loaded rotation group that has a lower average number of I/O operations received per second than any other slice of the LUN that is mapped to the lightly loaded rotation group.

11. The method of performing load balancing as in claim 10, wherein generating the RAID extent table further comprises generating each RAID extent entry in the RAID extent table such that each RAID extent entry in the RAID extent table indicates the same number of drive extents.

12. The method of performing load balancing as in claim 11, wherein each RAID extent entry represents a RAID stripe and indicates i) a first set of drive extents that are used to persistently store host data directed to the slices that are mapped to the rotation group that contains the RAID extent entry, and ii) a second set of drive extents that are used to store parity information.

13. The method of performing load balancing as in claim 12, wherein the size of each LUN is a sum of the capacities of the drive extents that are indicated by the RAID extent entries in the corresponding RAID extent group that are used to persistently store host data directed to the slices contained in the LUN.

14. The method of performing load balancing as in claim 13, wherein dividing the data storage drives in the array into a plurality of partnership groups of data storage drives comprises dividing the data storage drives in the array into partnership groups such that each partnership group contains a number of data storage drives that is not greater than a predetermined maximum partnership group size.

15. A data storage system that provides load balancing while providing mapped RAID (Redundant Array of Independent Disks) data protection, comprising:

at least one storage processor including processing circuitry and a memory;

an array of data storage drives communicably coupled to the storage processor; and wherein the memory has program code stored thereon for performing load balancing, wherein the program code, when executed by the processing circuitry, causes the processing circuitry to:

divide the data storage drives in the array into a plurality of partnership groups of data storage drives, wherein each data storage drive in the array is contained in only one of the partnership groups;

generate a RAID extent table, wherein the RAID extent table contains a plurality of RAID extent entries, wherein each RAID extent entry contained in the RAID extent table indicates a plurality of drive extents, wherein each drive extent comprises a unique contiguous region of non-volatile data storage located on one of the data storage drives and each one of the data storage drives has multiple drive extents located thereon, wherein the RAID extent table contains a plurality of RAID extent groups, wherein each one of the RAID extent groups contains a plurality of RAID extent entries and corresponds to one of the partnership groups, and wherein the RAID extent entries in each RAID extent group only indicate drive extents that are located in data storage drives contained in the corresponding one of the partnership groups;

divide each RAID extent group into a plurality of rotation groups, wherein each rotation group contains the same number of RAID extent entries, and wherein each RAID extent entry is contained in only one rotation group;

generate at least one corresponding logical unit (LUN) for each one of the RAID extent groups, wherein each LUN is made up of a plurality of slices, wherein host data directed to each slice is stored in drive extents indicated by RAID extent entries in a rotation group to which the slice is mapped according to a mapping between the slices in the LUN and the rotation groups in the corresponding RAID extent group; and for each RAID extent group, perform a rebalancing operation that includes i) identifying, within the RAID extent group, a heavily loaded rotation group having a high I/O load and a lightly loaded rotation group having a low I/O load, and ii) modifying the mapping between the slices in the corresponding LUN and the rotation groups in the RAID extent group such that at least one slice of the corresponding LUN that is mapped to the heavily loaded rotation group is remapped to the lightly loaded rotation group.

16. The data storage system of claim 15, further comprising:

wherein the program code, when executed by the processing circuitry, further causes the processing circuitry to:

divide each RAID extent group into a plurality of rotation groups at least in part by dividing each RAID extent group into an integral number of rotation groups, store the host data directed to each slice completely in drive extents indicated by the RAID extent entries contained in the rotation group to which the slice is mapped according to the mapping between the slices in the LUN that contains the slice and the rotation groups contained in the RAID extent group corresponding to the LUN that contains the slice; and wherein for each LUN the mapping between the slices in the LUN and the rotation groups contained in the corresponding RAID extent group maps multiple slices to each rotation group in the corresponding RAID extent group.

17. The data storage system of claim 16, wherein the program code, when executed by the processing circuitry, further causes the processing circuitry to divide each RAID extent group into a plurality of rotation groups further at least in part by dividing each RAID extent group into a plurality of rotation groups such that no data storage drive that contains a drive extent that is indicated by any one of the RAID extent entries contained in a rotation group contains another drive extent that is indicated by any other RAID extent entry in the same rotation group.

18. The data storage system of claim 17, wherein the program code, when executed by the processing circuitry, further causes the processing circuitry to divide each RAID extent group into a plurality of rotation groups further at least in part by dividing each RAID extent group into a plurality of rotation groups such that each one of the rotation groups contained within the same RAID extent group contains the same number of RAID extent entries.

19. The data storage system of claim 17, wherein the program code, when executed by the processing circuitry, further causes the processing circuitry to divide each RAID extent group into a plurality of rotation groups at least in part by dividing each RAID extent group into a plurality of rotation groups such that each rotation group contained within a RAID extent group contains a number of RAID extent entries that is equal to the total number of drives in the corresponding partnership group integer divided by the total number of drive extents indicated by each RAID extent entry.

20. A non-transitory computer readable medium for performing load balancing in a data storage system while providing mapped RAID (Redundant Array of Independent Disks) data protection, wherein the data storage system includes at least one storage processor and an array of data storage drives communicably coupled to the storage processor, the non-transitory computer readable medium comprising instructions stored thereon that when executed on processing circuitry in the storage processor perform the steps of:

dividing the data storage drives in the array into a plurality of partnership groups of data storage drives, wherein each data storage drive in the array is contained in only one of the partnership groups;

generating a RAID extent table, wherein the RAID extent table contains a plurality of RAID extent entries, wherein each RAID extent entry contained in the RAID extent table indicates a plurality of drive extents, wherein each drive extent comprises a unique contiguous region of non-volatile data storage located on one of the data storage drives and each one of the data storage drives has multiple drive extents located thereon, wherein the RAID extent table contains a plurality of RAID extent groups, wherein each one of the RAID extent groups contains a plurality of RAID extent entries and corresponds to one of the partnership groups, and wherein the RAID extent entries in each RAID extent group only indicate drive extents that are located in data storage drives contained in the corresponding one of the partnership groups;

dividing each RAID extent group into a plurality of rotation groups, wherein each rotation group contains the same number of RAID extent entries, and wherein each RAID extent entry is contained in only one rotation group;

generating at least one corresponding logical unit (LUN) for each one of the RAID extent groups, wherein each LUN is made up of a plurality of slices, wherein host data directed to each slice is stored in drive extents indicated by RAID extent entries in a rotation group to which the slice is mapped according to a mapping between the slices in the LUN and the rotation groups in the corresponding RAID extent group; and for each RAID extent group, performing a rebalancing operation that includes i) identifying, within the RAID extent group, a heavily loaded rotation group having a high I/O load and a lightly loaded rotation group having a low I/O load, and ii) modifying the mapping between the slices in the corresponding LUN and the rotation groups in the RAID extent group such that at least one slice of the corresponding LUN that is mapped to the heavily loaded rotation group is remapped to the lightly loaded rotation group.

* * * * *